(12) United States Patent
Wei

(10) Patent No.: US 10,330,944 B2
(45) Date of Patent: Jun. 25, 2019

(54) THREE-DIMENSIONAL DISPLAY DEVICE AND METHOD FOR FORMING THE SAME

(71) Applicant: BOE TECHNOLOGY GROUP CO., LTD., Beijing (CN)

(72) Inventor: Wei Wei, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 15/547,549

(22) PCT Filed: Jan. 6, 2017

(86) PCT No.: PCT/CN2017/070368
§ 371 (c)(1),
(2) Date: Jul. 31, 2017

(87) PCT Pub. No.: WO2017/185824
PCT Pub. Date: Nov. 2, 2017

(65) Prior Publication Data
US 2019/0041655 A1  Feb. 7, 2019

(30) Foreign Application Priority Data

Apr. 25, 2016  (CN) .......................... 2016 1 0262302

(51) Int. Cl.
*G02B 27/22* (2018.01)
*G02B 27/00* (2006.01)

(52) U.S. Cl.
CPC ..... *G02B 27/2214* (2013.01); *G02B 27/0093* (2013.01); *G02B 27/22* (2013.01)

(58) Field of Classification Search
CPC .......................... G02B 27/2214; G02B 27/0093

USPC .......................................................... 359/476
See application file for complete search history.

(56) References Cited

U.S. PATENT DOCUMENTS

| 2003/0161040 A1* | 8/2003 | Ishii ................... G02B 27/2214 359/463 |
| 2007/0058127 A1* | 3/2007 | Mather ............... G02B 27/2214 349/159 |
| 2012/0170115 A1 | 7/2012 | Zhang et al. |

(Continued)

FOREIGN PATENT DOCUMENTS

| CN | 2556670 Y | 6/2003 |
| CN | 102243402 A | 11/2011 |
| CN | 202121716 U | 1/2012 |

(Continued)

OTHER PUBLICATIONS

International Search Report and Written Opinion for Application No. PCT/CN2017/070368, dated Mar. 31, 2017, 14 Pages.

(Continued)

*Primary Examiner* — Wen Huang
(74) *Attorney, Agent, or Firm* — Brooks Kushman P.C.

(57) ABSTRACT

A three-dimensional display device and a method for forming the same are provided. The three-dimensional display device includes a display panel and a parallax barrier on the display panel. The parallax barrier includes a first parallax sub-barrier, a resin layer on the first parallax sub-barrier and a second parallax sub-barrier on the resin layer. A thickness of the parallax barrier is larger than a predetermined thickness, where the predetermined thickness d1 is smaller than or equal to 1 μm.

20 Claims, 3 Drawing Sheets

(56) References Cited

U.S. PATENT DOCUMENTS

2016/0124233 A1   5/2016   Wei

FOREIGN PATENT DOCUMENTS

| CN | 202171686 U | 3/2012 |
| CN | 202171689 U | 3/2012 |
| CN | 102566060 A | 7/2012 |
| CN | 202815375 U | 3/2013 |
| CN | 202948226 U | 5/2013 |
| CN | 203191638 U | 9/2013 |
| CN | 103676171 A | 3/2014 |
| CN | 103955067 A | 7/2014 |
| CN | 203838470 U | 9/2014 |
| CN | 104977724 A | 10/2015 |
| CN | 105093545 A | 11/2015 |
| CN | 105445948 A | 3/2016 |
| CN | 105739109 A | 7/2016 |
| CN | 205539749 U | 8/2016 |
| JP | 2005321449 A | 11/2005 |
| JP | 2006330018 A | 12/2006 |
| TW | 201003121 A | 1/2010 |

OTHER PUBLICATIONS

First Office Action for Chinese Application No. 201610262302.5, dated Aug. 28, 2017, 9 Pages.

\* cited by examiner

THREE-DIMENSIONAL DISPLAY DEVICE AND METHOD FOR FORMING THE SAME

CROSS-REFERENCE TO RELATED APPLICATIONS

This application is the U.S. national phase of PCT Application No. PCT/CN2017/070368 filed on Jan. 6, 2017, which claims priority to Chinese Patent Application No. 201610262302.5 filed on Apr. 25, 2016, the disclosures of which are incorporated in their entirety by reference herein.

TECHNICAL FIELD

The present disclosure relates to the field of display technology, and in particular to a three-dimensional display device and a method for forming the same.

BACKGROUND

Along with the development of display technology, the three-dimensional display is becoming more and more common. At present, the three-dimensional display technology mainly includes a glass-type three-dimensional display and a naked eye type three-dimensional display. The naked eye type three-dimensional display technology mainly adopts a parallax barrier, a lens, a directional backlight, etc. The parallax barrier is commonly used at present.

The parallax barrier achieves the three-dimensional display through a fence-like barrier between a display panel and a pair of glasses. Through slits, pixels of the display panel observed by two eyes respectively are different, and a parallax image may occur as a result. In a practical application, when the opening of the slit of the parallax barrier is relatively large, a crosstalk may occur between the images observed by the left and right eyes respectively. In order to reduce the crosstalk, the opening of the slit may be decreased. However, display brightness may be reduced when the opening of the slit is decreased. Therefore, it is a main research direction in the field to reduce the crosstalk between images without reducing the display brightness.

SUMMARY

In view of this, a three-dimensional display device and a method for forming the same are provided in the present disclosure, to reduce the crosstalk between images without reducing the display brightness.

In order to solve the above technical issue, a three-dimensional display device is provided in the present disclosure, including a display panel and a parallax barrier on the display panel, where the parallax barrier includes a first parallax sub-barrier, a resin layer on the first parallax sub-barrier and a second parallax sub-barrier on the resin layer. A thickness of the parallax barrier is larger than a predetermined thickness, where the predetermined thickness $d_1$ is smaller than or equal to 1 µm.

Optionally, the thickness of the parallax barrier is smaller than or equal to a vertical distance between the display panel and the parallax barrier.

Optionally, the display panel includes a color filter substrate, and the vertical distance between the display panel and the parallax barrier is a vertical distance from a surface of the color filter substrate adjacent to the parallax barrier to a center of the parallax barrier.

Optionally, a thickness of the first parallax sub-barrier and a thickness of the second parallax sub-barrier are not larger than the predetermined thickness $d_1$.

Optionally, the three-dimensional display device further includes a distance adjustment layer, arranged between the display panel and the parallax barrier and at any pair or two pairs of opposite side edges of the display panel. The distance adjustment layer is configured to adjust the vertical distance between the display panel and the parallax barrier.

Optionally, a first adhesion layer is between the display panel and the distance adjustment layer. The distance adjustment layer is adhered to any pair or two pairs of opposite side edges of the display panel through the first adhesion layer. A second adhesion layer is between the distance adjustment layer and the parallax barrier. The parallax barrier is adhered to the distance adjustment layer through the second adhesion layer.

Optionally, the distance adjustment layer is made of a piezoelectric material.

Optionally, the piezoelectric material includes a piezoelectric crystal, a piezoelectric ceramic, a piezoelectric polymer and a piezoelectric composite of ceramic and polymer.

Optionally, the display panel includes a distance detection module configured to detect a distance between human eyes and the display panel.

Optionally, the resin layer is an opaque resin layer including nonopaque stripes and opaque stripes arranged alternately. The opaque stripes correspond to slits of the parallax barrier.

Optionally, a difference value between the thickness of the parallax barrier and the predetermined thickness is in direct proportion to a width of each slit.

A method for forming a three-dimensional display device is further provided, including: forming a display panel; forming a parallax barrier on the display panel, where the parallax barrier includes a first parallax sub-barrier, a resin layer on the first parallax sub-barrier and a second parallax sub-barrier on the resin layer. A thickness of the parallax barrier is larger than a predetermined thickness, and the predetermined thickness $d_1$ is smaller than or equal to 1 µm.

Optionally, the thickness of the parallax barrier is smaller than or equal to a vertical distance between the display panel and the parallax barrier.

Optionally, the display panel includes a color filter substrate, and the vertical distance between the display panel and the parallax barrier is a vertical distance from a surface of the color filter substrate adjacent to the parallax barrier to a center of the parallax barrier.

Optionally, subsequent to forming the display panel and prior to forming the parallax barrier on the display panel, the method further includes: forming a distance adjustment layer at any pair or two pairs of opposite side edges of the display panel, and adjusting the vertical distance between the display panel and the parallax barrier through the distance adjustment layer. The forming the parallax barrier on the display panel further includes: forming the parallax barrier on the distance adjustment layer.

Optionally, the distance adjustment layer is made of a piezoelectric material.

Optionally, the piezoelectric material includes a piezoelectric crystal, a piezoelectric ceramic, a piezoelectric polymer and a piezoelectric composite of ceramic and polymer.

Optionally, the method further includes: forming a distance detection module arranged on the display panel and configured to detect a distance between human eyes and the display panel. The adjusting the vertical distance between the display panel and the parallax barrier through the distance adjustment layer includes: adjusting, based on a detected distance between the human eyes and the display panel, a voltage applied to the distance adjustment layer, to deform the distance adjustment layer and adjust the vertical distance between the display panel and the parallax barrier.

Optionally, subsequent to forming the display panel and prior to forming the distance adjustment layer, the method further includes: forming a first adhesion layer on the display panel, and adhering the distance adjustment layer to any pair or two pairs of opposite side edges of the display panel through the first adhesion layer.

Optionally, subsequent to forming the distance adjustment layer and prior to forming the parallax barrier on the display panel, the method further includes: forming a second adhesion layer between the distance adjustment layer and the parallax barrier; adhering the parallax barrier to the distance adjustment layer through the second adhesion layer.

Optionally, in the case that the resin layer is an opaque resin layer, the method further includes: patterning the parallax barrier to form nonopaque stripes and opaque stripes arranged alternately, where the nonopaque stripes correspond to slits of the parallax barrier.

According to at least one embodiment of the present disclosure, when the pixels of the display panel emit light beams, through the parallax barrier in at least one embodiment of the present disclosure, the position where the light beams emitted by the pixels illuminate on may be changed, so that the illuminating range of the light beams emitted by the pixels may be smaller, and then an overlapping region of the illuminating range of the light beams emitted by adjacent pixels may be smaller. According to at least one embodiment of the present disclosure, a crosstalk between images may be reduced without reducing the display brightness.

BRIEF DESCRIPTION OF THE DRAWINGS

The following drawings merely relate to some embodiments of the present disclosure, and based on these drawings, a person skilled in the art may obtain the other drawings without any creative effort.

DETAILED DESCRIPTION

The present disclosure will be described hereinafter in conjunction with the drawings and embodiments. The following embodiments are for illustrative purposes only, but shall not be used to limit the scope of the present disclosure.

Figure 1:
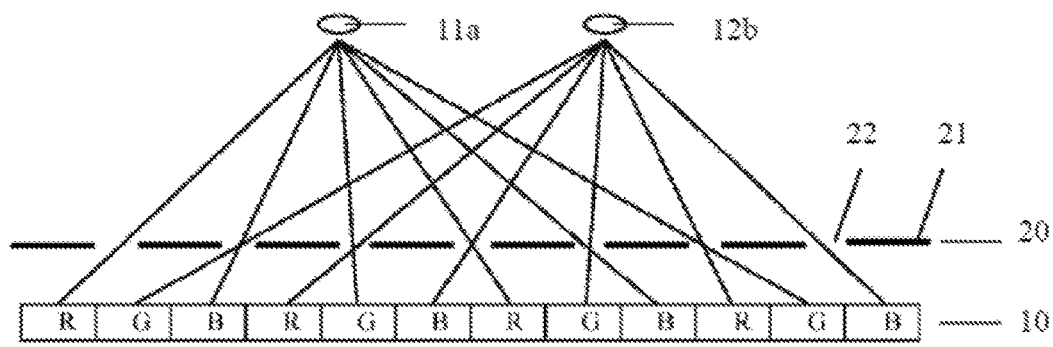
FIG. 1 is a schematic view of a three-dimensional display device in the related art.

FIG. 1 is a schematic view of a three-dimensional display device in the related art. As shown in FIG. 1, the parallax barrier 20 is a slit grating, including opaque stripes 21 and nonopaque stripes 22 between the opaque stripes 21. The nonopaque stripes 22 correspond to the slits of the grating. The slits have an identical width and arranged at an identical interval. The principle of achieving the three-dimensional display through the parallax barrier 20 is: the light beams emitted by the pixels of the display panel 10 pass through the nonopaque stripes 22 in the parallax barrier 20 and reach the observation positions. It can be seen from FIG. 1 that, the left eye 11a and the right eye 12b of an observer at the observation position may observe different pixels of the display panel 10, and then a parallax image may occur accordingly and a three-dimensional display effect may be generated by the brain of the observer, thereby achieving the three-dimensional display. In FIG. 1, when the opening of the slit of the parallax barrier is relatively large (i.e., the width of the slit is relatively large), a crosstalk may occur. For example, an optical signal supposed to reach the left eye 11a reaches the right eye 12b. However, the display brightness may be reduced in the case that the crosstalk is reduced by decreasing the opening of the slit.

A three-dimensional display device and a method for forming the same are provided in the present disclosure. By arranging a barrier having a certain thickness in the three-dimensional display device, a crosstalk between images may be reduced effectively while reducing the adverse influence on the display brightness.

Figure 2:
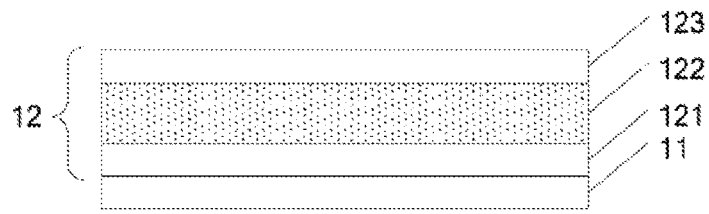
FIG. 2 is a schematic view of a three-dimensional display device in at least one embodiment of the present disclosure.

In at least one embodiment of the present disclosure, as shown in FIG. 2, the three-dimensional display device includes a display panel 11 and a parallax barrier 12 on the display panel 11. The parallax barrier 12 may include a first parallax sub-barrier 121, a resin layer 122 on the first parallax sub-barrier 121 and a second parallax sub-barrier 123 on the resin layer. A thickness of the parallax barrier 12 is larger than a predetermined thickness $d_1$. The predetermined thickness is also called threshold thickness, which refers to a maximum thickness of a parallax barrier specific to a width of a slit in the parallax barrier. A crosstalk may be reduced by increasing the thickness of the parallax barrier, without changing the width of the slit in the parallax barrier. In the related art, a universal parallax barrier generally has a thickness less than 1 µm. In order to reduce the crosstalk between display images, the parallax barrier in at least one embodiment of the present disclosure may have a thickness larger than the thickness of the universal parallax barrier in the related art. Therefore, in at least one embodiment of the present disclosure, the thickness of the parallax barrier is larger than the predetermined thickness. The predetermined thickness $d_1$ is less than or equal to 1 µm. Optionally, the thickness of the parallax barrier may be greater than 1 µm. Alternatively, when the predetermined thickness is less than 1 µm and the thickness of the parallax barrier is larger than the predetermined thickness, the thickness of the parallax barrier may be less than or equal to 1 µm, or greater than 1 µm.

It can be seen from the above that, according to at least one embodiment of the present disclosure, when the pixels of the display panel emit light beams, through the parallax barrier in at least one embodiment of the present disclosure, the position where the light beams emitted by the pixels illuminate on may be changed, so that the illuminating range of the light beams emitted by the pixels may be smaller, and then an overlapping region of the illuminating range of the light beams emitted by adjacent pixels may be smaller. According to at least one embodiment of the present disclosure, a crosstalk between images may be reduced without reducing the display brightness.

Optionally, the thickness d of the parallax barrier may be: $d_1 < d \leq d_2$, where d is the thickness d of the parallax barrier, $d_1$ is the predetermined thickness, and $d_2$ is a vertical distance between the display panel and the parallax barrier.

Optionally, a difference value between the thickness of the parallax barrier and the predetermined thickness may be determined based on the width of the slit in the parallax barrier. For example, when the width of the slit is relatively large, the crosstalk may be serious, so the larger the width of the slit is, the larger the above difference value may be. That is, the difference value is in direct proportion to the width of the slit. In other words, when the width of the slit in the parallax barrier is relatively large, the thickness of the parallax barrier may also be relatively large. Optionally, the thickness of the parallax barrier may further be defined by other factors (e.g., a position of the pixel edge relative to the slit, a distance between the display panel and the parallax barrier).

Figure 3:
FIG. 3 is a schematic view of a three-dimensional display device in at least one embodiment of the present disclosure.

In at least one embodiment of the present disclosure, as shown in FIG. 3, the three-dimensional display device includes: a display panel 21, a distance adjustment layer 22 on the display panel 21 and a parallax barrier 23 on the distance adjustment layer 22.

In at least one embodiment of the present disclosure, the first parallax sub-barrier 121 and the second parallax sub-barrier 123 of the parallax barrier 23 may be made of a material including but not limited to color film and printing ink of which the thickness are not greater than 1 μm. The resin layer may be opaque or nonopaque. When the resin layer is nonopaque, the resin layer may be patterned when forming the parallax barrier, to form nonopaque stripes and opaque stripes arranged alternately. The opaque stripes correspond to slits of the parallax barrier to make the light to pass through.

In a practical application, the display panel 21 may consist of a lower polarizer, an array substrate, a liquid crystal layer, a color filter substrate and an upper polarizer. In addition, generally the display panel 21 is rectangular. Therefore, the display panel 21 may have two pairs of opposite side edges (i.e., two side edges in a width direction and two side edges in a length direction).

In order to guarantee the display brightness and the stability of the display device, in at least one embodiment of the present disclosure, the distance adjustment layer 22 is adhered to any pair or two pairs of opposite side edges of the display panel 21. That is, in a practical application, the distance adjustment layer 22 may be arranged at two side edges of the display panel 21 along a width direction or a length direction thereof, or the distance adjustment layer 22 may be arranged at two side edges of the display panel 21 along the width direction thereof and two side edges of the display panel 21 along the length direction thereof, i.e., the distance adjustment layer 22 may be arranged around the display panel 21.

In a practical application, certain materials have an asymmetry liquid crystal characteristic structure may be deformed under an external force (e.g., pressure or tension). As a result, electrons in the material may be distributed unevenly at certain regions, and then a net electric field may be formed on the outside surface of the material. At this time, when a voltage signal is applied to the material, the material may be deformed due to the voltage, and the deformation may be changed along with the voltage. This is called piezoelectric effect, and such material is called piezoelectric material.

In at least one embodiment of the present disclosure, the distance adjustment layer 22 is made of a piezoelectric material. The piezoelectric material includes but is not limited to a piezoelectric crystal, a piezoelectric ceramic, a piezoelectric polymer and a piezoelectric composite of ceramic and polymer.

Taking advantages of the above characteristic of the distance adjustment layer 22, in at least one embodiment of the present disclosure, it is able to adjust a vertical distance between the display panel and the parallax barrier through the distance adjustment layer 22. The display panel includes a color filter substrate, and the vertical distance between the display panel and the parallax barrier is a vertical distance from a surface of the color filter substrate adjacent to the parallax barrier to a center of the parallax barrier.

Figure 4:
FIG. 4 is a schematic view of a three-dimensional display device in at least one embodiment of the present disclosure.

As shown in FIG. 4, in order to facilitate the fixation of the parallax barrier 23, in the display device in at least one embodiment of the present disclosure, a first adhesion layer 25 is between the display panel 21 and the distance adjustment layer 22, and a second adhesion layer 26 is between the distance adjustment layer 22 and the parallax barrier 23. The distance adjustment layer 22 is adhered to any pair or two pairs of opposite side edges of the display panel 21 through the first adhesion layer 25, and the parallax barrier 23 is adhered to the distance adjustment layer 22 through the second adhesion layer 26. A side of each of the first adhesion layer 25 and the second adhesion layer 26 may be identical to a size of the distance adjustment layer 22.

Figure 5:
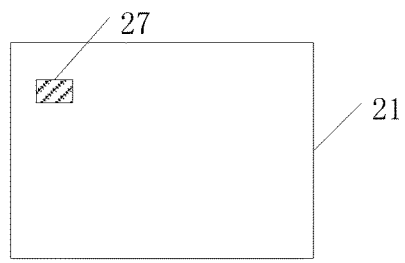
FIG. 5 is a schematic view of a three-dimensional display device in at least one embodiment of the present disclosure.

In order to make the thickness of the distance adjustment layer 22 to better meet the requirement of the three-dimensional display of the three-dimensional display device, as shown in FIG. 5, the display panel 21 in at least one embodiment of the present disclosure may further include a distance detection module 27 to detect to a distance between human eyes and the display panel. The distance detection module 27 may be a distance detection sensor. The voltage applied to the distance adjustment layer 22 may be determined based on the distance between human eyes and the display panel, so as to adjust the vertical distance between the display panel 21 and the distance adjustment layer 22. As such, the three-dimensional display effect may better meet the requirement of the user.

Figure 6:
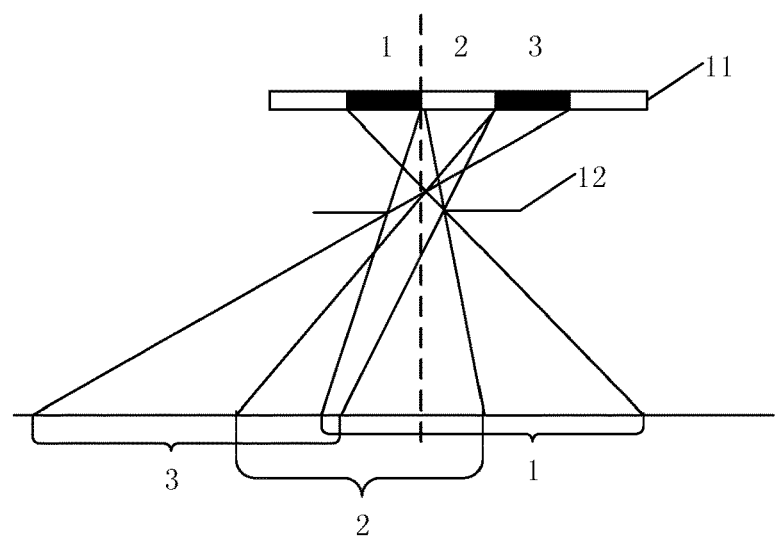
FIG. 6 is a schematic view showing an illuminating range of a three-dimensional display device in the related art.
Figure 7:
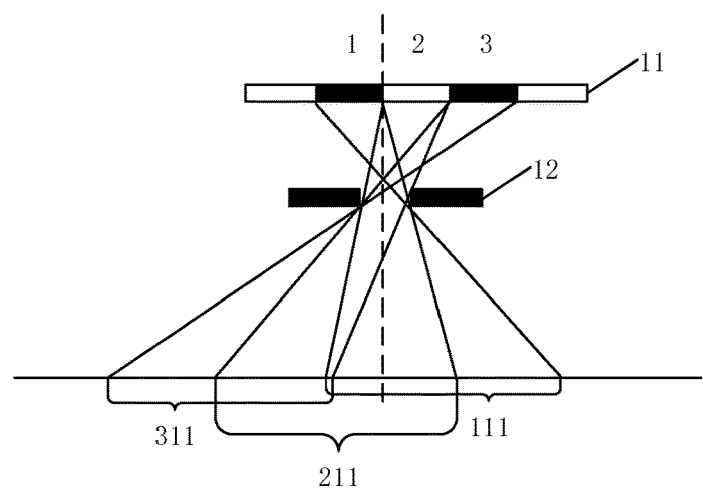
FIG. 7 is a schematic view showing an illuminating range of a three-dimensional display device in at least one embodiment of the present disclosure.

FIG. 6 is a schematic view showing an illuminating range of a three-dimensional display device in the related art, and FIG. 7 is a schematic view showing an illuminating range of a three-dimensional display device in at least one embodiment of the present disclosure.

It can be seen from FIG. 6 that, light beams which are emitted by a pixel 1 of the display panel 11 and then pass through the parallax barrier 12 illuminate on a region 1, and light beams which are emitted by a pixel 2 of the display panel 11 and then pass through the parallax barrier 12 illuminate on a region 2, and light beams which are emitted by a pixel 3 of the display panel 11 and then pass through the parallax barrier 12 illuminate on a region 3.

It can be seen from FIG. 7 that, by the parallax barrier 12 in at least one embodiment of the present disclosure, light beams which are emitted by a pixel 1 of the display panel 11 and then pass through the parallax barrier 12 illuminate on a region 111, and light beams which are emitted by a pixel 2 of the display panel 11 and then pass through the parallax barrier 12 illuminate on a region display panel 211, and light beams which are emitted by a pixel 3 of the display panel 11 and then pass through the parallax barrier 12 illuminate on a region 311.

It can be seen from FIG. 7 that, an area of an overlapping region of the region 311 and the region 111 in FIG. 7 is smaller than an area of an overlapping region of the region 3 and region 1 in FIG. 6. Taking the pixel 2 in FIG. 6 and FIG. 7 for example, the parallax barrier 12 is opaque, when the parallax barrier 12 becomes thicker, light beams emitted from light-emitting points at the left and right ends of the pixel 2 respectively change accordingly. In compared with FIG. 6, the light beams emitted by the pixel 2 and then passing through the parallax barrier 12 in FIG. 7 may be more focused, i.e., the illuminating range of the light beams emitted by the pixel 2 may be smaller. Similarly, the illuminating ranges of the light beams emitted by the pixel 3 and the pixel 1 may also be smaller. As such, the interference of both the region 311 and the region 111 on the region display panel 211 may be reduced. Therefore, the crosstalk between images may be reduced in compared with the related art.

It can be seen from the above that, according to at least one embodiment of the present disclosure, when the pixels of the display panel emit light beams, through the parallax barrier in at least one embodiment of the present disclosure, the position where the light beams emitted by the pixels illuminate on may be changed, so that the illuminating range of the light beams emitted by the pixels may be smaller, and then an overlapping region of the illuminating range of the light beams emitted by adjacent pixels may be smaller. According to at least one embodiment of the present disclosure, a crosstalk between images may be reduced without reducing the display brightness.

Figure 8:
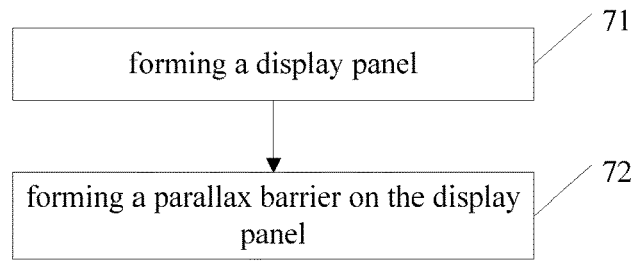
FIG. 8 is a flow chart of a method for forming a three-dimensional display device in at least one embodiment of the present disclosure.

A method for forming a three-dimensional display device is provided in at least one embodiment of the present disclosure. As shown in FIG. 8, the method includes:

Step 71: forming a display panel;

Step 72: forming a parallax barrier on the display panel, where the parallax barrier includes a first parallax sub-barrier, a resin layer on the first parallax sub-barrier and a second parallax sub-barrier on the resin layer, a thickness of the parallax barrier is larger than a predetermined thickness $d_1$, where the predetermined thickness $d_1$ is less than or equal to 1 μm.

The resin layer may be opaque or nonopaque. In order to guarantee the display effect, when forming the thicken parallax panel, the parallax barrier needs to be patterned to form nonopaque stripes and opaque stripes arranged alternately.

It can be seen from the above that, according to at least one embodiment of the present disclosure, when the pixels of the display panel emit light beams, through the parallax barrier in at least one embodiment of the present disclosure, the position where the light beams emitted by the pixels illuminate on may be changed, so that the illuminating range of the light beams emitted by the pixels may be smaller, and then an overlapping region of the illuminating range of the light beams emitted by adjacent pixels may be smaller. According to at least one embodiment of the present disclosure, a crosstalk between images may be reduced without reducing the display brightness.

Figure 9:
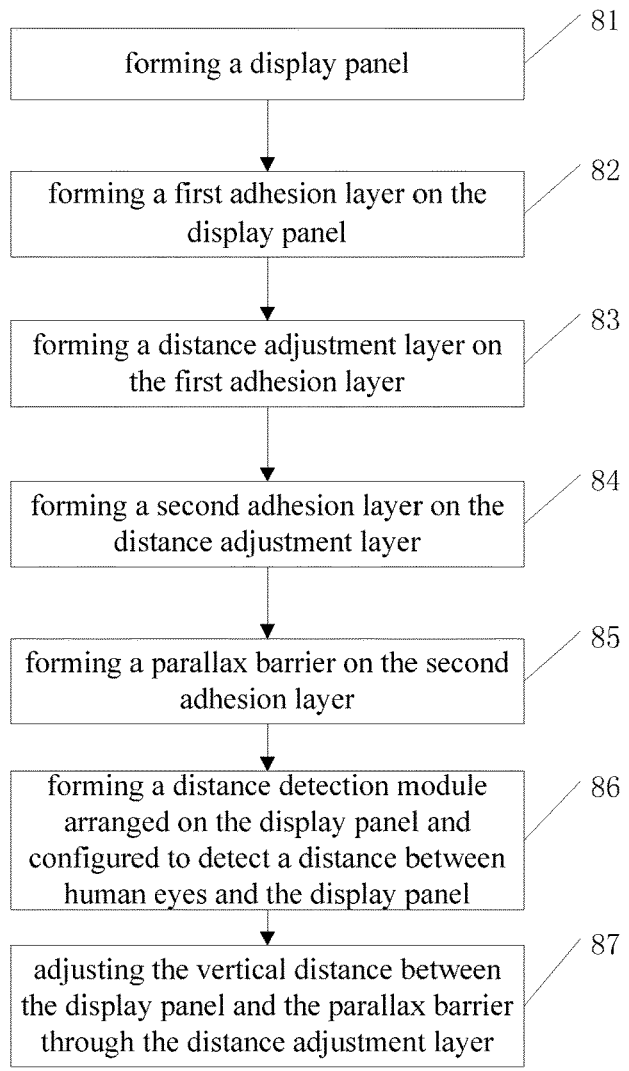
FIG. 9 is a flow chart of a method for forming a three-dimensional display device in at least one embodiment of the present disclosure.

A method for forming a three-dimensional display device is provided in at least one embodiment of the present disclosure. As shown in FIG. 9, the method includes:

Step 81: forming a display panel.

Step 82: forming a first adhesion layer on the display panel to make the three-dimensional display device more firm, where the first adhesion layer is at any pair or two pairs of opposite side edges of the display panel.

Step 83: forming a distance adjustment layer on the first adhesion layer, where the distance adjustment layer is adhered to any pair or two pairs of opposite side edges of the display panel through the first adhesion layer.

The distance adjustment layer is made of a piezoelectric material. The piezoelectric material includes but is not limited to a piezoelectric crystal, a piezoelectric ceramic, a piezoelectric polymer and a piezoelectric composite of ceramic and polymer.

Step 84: forming a second adhesion layer on the distance adjustment layer to make the three-dimensional display device more firm.

Step 85: forming a parallax barrier on the second adhesion layer, where the parallax barrier includes a first parallax sub-barrier, a resin layer on the first parallax sub-barrier and a second parallax sub-barrier on the resin layer, and a thickness of the parallax barrier is larger than a predetermined thickness $d_1$, where the predetermined thickness $d_1$ is less than or equal to 1 μm.

When the resin layer is an opaque resin layer, the parallax barrier needs to be patterned to form nonopaque stripes and opaque stripes arranged alternately. The nonopaque stripes correspond to slits of the parallax barrier, to enable the light beams to pass through.

Step 86: forming a distance detection module arranged on the display panel and configured to detect a distance between human eyes and the display panel.

Step 87: adjusting the vertical distance between the display panel and the parallax barrier through the distance adjustment layer.

To be specific, a voltage applied to the distance adjustment layer is adjusted based on a detected distance between the human eyes and the display panel, to deform the distance adjustment layer and adjust the vertical distance between the display panel and the parallax barrier.

The display panel may further include a color filter substrate. The vertical distance between the display panel and the parallax barrier is a vertical distance from a surface of the color filter substrate adjacent to the parallax barrier to a center of the parallax barrier.

It can be seen from the above that, according to at least one embodiment of the present disclosure, when the pixels of the display panel emit light beams, through the parallax barrier in at least one embodiment of the present disclosure, the position where the light beams emitted by the pixels illuminate on may be changed, so that the illuminating range of the light beams emitted by the pixels may be smaller, and then an overlapping region of the illuminating range of the light beams emitted by adjacent pixels may be smaller. According to at least one embodiment of the present disclosure, a crosstalk between images may be reduced without reducing the display brightness.

The above are merely some of the embodiments of the present disclosure. A person skilled in the art may make further modifications and improvements without departing from the principle of the present disclosure, and these modifications and improvements shall also fall within the scope of the present disclosure.

What is claimed is:

1. A three-dimensional display device, comprising a display panel and a parallax barrier on the display panel, wherein the parallax barrier comprises a first parallax sub-barrier, an opaque resin layer on the first parallax sub-barrier and a second parallax sub-barrier on the opaque resin layer;

a thickness of the parallax barrier is larger than a predetermined thickness $d_1$, wherein the predetermined thickness $d_1$ is less than or equal to 1 µm.

2. The three-dimensional display device according to claim 1, wherein the thickness of the parallax barrier is smaller than or equal to a vertical distance between the display panel and the parallax barrier.

3. The three-dimensional display device according to claim 2, wherein the display panel comprises a color filter substrate, and the vertical distance between the display panel and the parallax barrier is a vertical distance from a surface of the color filter substrate adjacent to the parallax barrier to a center of the parallax barrier.

4. The three-dimensional display device according to claim 1, wherein a thickness of the first parallax sub-barrier and a thickness of the second parallax sub-barrier are not larger than the predetermined thickness $d_1$.

5. The three-dimensional display device according to any claim 1, further comprising:
a distance adjustment layer, arranged between the display panel and the parallax barrier and at any pair or two pairs of opposite side edges of the display panel;
wherein the distance adjustment layer is configured to adjust the vertical distance between the display panel and the parallax barrier.

6. The three-dimensional display device according to claim 5, wherein a first adhesion layer is arranged between the display panel and the distance adjustment layer;
the distance adjustment layer is adhered to any pair or two pairs of opposite side edges of the display panel through the first adhesion layer;
a second adhesion layer is arranged between the distance adjustment layer and the parallax barrier; and
the parallax barrier is adhered to the distance adjustment layer through the second adhesion layer.

7. The three-dimensional display device according to claim 5, wherein the distance adjustment layer is made of a piezoelectric material.

8. The three-dimensional display device according to claim 7, wherein the piezoelectric material comprises a piezoelectric crystal, a piezoelectric ceramic, a piezoelectric polymer and a piezoelectric composite of ceramic and polymer.

9. The three-dimensional display device according to claim 5, wherein the display panel comprises a distance detection module configured to detect a distance between human eyes and the display panel.

10. The three-dimensional display device according to any claim 1, wherein the opaque resin layer comprises nonopaque stripes and opaque stripes arranged alternately;
wherein the opaque stripes correspond to slits of the parallax barrier.

11. The three-dimensional display device according to claim 10, wherein a difference value between the thickness of the parallax barrier and the predetermined thickness is in direct proportion to a width of each slit.

12. A method for forming a three-dimensional display device, comprising:
forming a display panel;
forming a parallax barrier on the display panel,
wherein the parallax barrier comprises a first parallax sub-barrier, an opaque resin layer on the first parallax sub-barrier and a second parallax sub-barrier on the opaque resin layer, and a thickness of the parallax barrier is larger than a predetermined thickness $d_1$, wherein the predetermined thickness $d_1$ is less than or equal to 1 µm.

13. The method according to claim 12, wherein the thickness of the parallax barrier is smaller than or equal to a vertical distance between the display panel and the parallax barrier.

14. The method according to claim 13, wherein the display panel comprises a color filter substrate, and the vertical distance between the display panel and the parallax barrier is a vertical distance from a surface of the color filter substrate adjacent to the parallax barrier to a center of the parallax barrier.

15. The method according to claim 12, wherein subsequent to forming the display panel and prior to forming the parallax barrier on the display panel, the method further comprises:
forming a distance adjustment layer at any pair or two pairs of opposite side edges of the display panel, and adjusting the vertical distance between the display panel and the parallax barrier through the distance adjustment layer; and
the forming the parallax barrier on the display panel further comprises:
forming the parallax barrier on the distance adjustment layer.

16. The method according to claim 15, wherein the distance adjustment layer is made of a piezoelectric material.

17. The method according to claim 16, wherein the piezoelectric material comprises a piezoelectric crystal, a piezoelectric ceramic, a piezoelectric polymer and a piezoelectric composite of ceramic and polymer.

18. The method according to claim 15, further comprising:
forming a distance detection module arranged on the display panel and configured to detect a distance between human eyes and the display panel;
wherein the adjusting the vertical distance between the display panel and the parallax barrier through the distance adjustment layer comprises:
adjusting, based on a detected distance between the human eyes and the display panel, a voltage applied to the distance adjustment layer, to deform the distance adjustment layer and adjust the vertical distance between the display panel and the parallax barrier.

19. The method according to claim 15, wherein subsequent to forming the display panel and prior to forming the distance adjustment layer, the method further comprises:
forming a first adhesion layer on the display panel, and adhering the distance adjustment layer to any pair or two pairs of opposite side edges of the display panel through the first adhesion layer;
wherein subsequent to forming the distance adjustment layer and prior to forming the parallax barrier on the display panel, the method further comprises:
forming a second adhesion layer between the distance adjustment layer and the parallax barrier; and
adhering the parallax barrier to the distance adjustment layer through the second adhesion layer.

20. The method according to claim 12, the method further comprises:
patterning the parallax barrier to form nonopaque stripes and opaque stripes arranged alternately, wherein the nonopaque stripes correspond to slits of the parallax barrier.

* * * * *